(12) United States Patent
Yataka et al.

(10) Patent No.: US 11,983,888 B2
(45) Date of Patent: May 14, 2024

(54) IMAGE CHANGE DETECTION DEVICE AND IMAGE CHANGE DETECTION METHOD

(71) Applicant: Mitsubishi Electric Corporation, Tokyo (JP)

(72) Inventors: Ryoma Yataka, Tokyo (JP); Masashi Shiraishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 358 days.

(21) Appl. No.: 17/565,900

(22) Filed: Dec. 30, 2021

(65) Prior Publication Data
US 2022/0122270 A1    Apr. 21, 2022

Related U.S. Application Data

(63) Continuation of application No. PCT/JP2019/031690, filed on Aug. 9, 2019.

(51) Int. Cl.
*G06K 9/00*         (2022.01)
*G01S 13/89*        (2006.01)
(Continued)

(52) U.S. Cl.
CPC .............. *G06T 7/20* (2013.01); *G01S 13/89* (2013.01); *G06T 3/60* (2013.01); *G06T 2207/10028* (2013.01)

(58) Field of Classification Search
CPC ... G06T 7/20; G06T 3/60; G06T 2207/10028; G06T 7/254; G01S 13/89; G01S 7/41; G01S 13/04
See application file for complete search history.

(56) References Cited

U.S. PATENT DOCUMENTS

2006/0045353 A1*  3/2006  Brand ............... G06F 18/213
                                                    382/168
2008/0140751 A1*  6/2008  Ide ................... G06F 18/00
                                                    708/520
(Continued)

FOREIGN PATENT DOCUMENTS

JP         2008-146353 A      6/2008

OTHER PUBLICATIONS

López-Rodríguez, Patricia, et al. "Non-cooperative target recognition by means of singular value decomposition applied to radar high resolution range profiles." Sensors 15.1 (2014): 422-439. (Year: 2014).*

(Continued)

*Primary Examiner* — Andrew M Moyer
(74) *Attorney, Agent, or Firm* — Birch, Stewart, Kolasch & Birch, LLP

(57) ABSTRACT

This image change detection device includes a subspace updating unit that, when a determination unit determines that there has been no change, updates a first subspace by rotating the first subspace so that the first subspace approaches a second subspace. When the determination unit determines that there has been no change, a degree-of-change calculating unit calculates the degree of change between the first subspace updated by the subspace updating unit and a second subspace whose bases are left singular vectors of an image in a change detection period next to a change detection period.

6 Claims, 10 Drawing Sheets

(51) Int. Cl.
*G06T 3/60* (2006.01)
*G06T 7/20* (2017.01)

(56) References Cited

U.S. PATENT DOCUMENTS

2008/0243437 A1    10/2008  Ide et al.
2015/0055826 A1*    2/2015  Real .................... G06T 7/248
                                                         382/103
2018/0059237 A1*    3/2018  Liu ..................... G01S 13/89

OTHER PUBLICATIONS

Narayanamurthy, Praneeth, and Namrata Vaswani. "Provable dynamic robust PCA or robust subspace tracking." IEEE Transactions on Information Theory 65.3 (2018): 1547-1577. (Year: 2018).*
Idé et al., "Knowledge Discovery from Heterogeneous Dynamic Systems using Change-Point Correlations," In Proceedings of 2005 SIAM International Conference on Data Mining (SDM 05), Oct. 4, 2004, total 5 pages.
Simon et al., "On Updating Problems in Latent Semantic Indexing," SIAM Journal on Scientific Computing, vol. 21, No. 2, Nov. 1997, total 12 pages.

\* cited by examiner ent invention includes processing circuitry to calculate, by a
IMAGE CHANGE DETECTION DEVICE AND IMAGE CHANGE DETECTION METHOD

CROSS REFERENCE TO RELATED APPLICATIONS

This application is a Continuation of PCT International Application No. PCT/JP2019/031690, filed on Aug. 9, 2019, which is hereby expressly incorporated by reference into the present application.

TECHNICAL FIELD

The present invention relates to an image change detection device and an image change detection method for determining whether or not an image has changed.

BACKGROUND ART

Non-Patent Literature 1 below discloses a singular spectrum transformation. The singular spectrum transformation is one of methods for determining whether or not an image in a change detection period has changed from an image in a period for comparison. In the singular spectrum transformation, left singular vectors of an image in a period for comparison among images generated on the basis of observation radio waves of a radar are calculated, and a subspace (hereinafter, referred to as a "first subspace") whose bases are the left singular vectors is generated. In addition, in the singular spectrum transformation, left singular vectors of an image in a change detection period among images generated from the observation radio waves of a radar are calculated, and a subspace (hereinafter, referred to as a "second subspace") whose bases are the left singular vectors is generated. In the singular spectrum transformation, the degree of change between the first subspace and the second subspace is calculated, and whether or not the image in the change detection period has changed from the image in the period for comparison is determined on the basis of the degree of change.

CITATION LIST

Non-Patent Literature

Non-Patent Literature 1: T. Ide and K. Inoue, "Knowledge discovery from heterogeneous dynamic systems using change-point correlations", In Proceedings of 2005 SIAM International Conference on Data Mining (SDM 05), pages 571-575, 2005.

SUMMARY OF INVENTION

Technical Problem

In a case of determining whether or not an image in each of a plurality of change detection periods has changed from an image in each of a plurality of periods for comparison, in the singular spectrum transformation disclosed in Non-Patent Literature 1, it is required to calculate left singular vectors of the images in the periods for comparison and generate first subspaces whose bases are the respective left singular vectors. The left singular vectors are obtained by performing singular value decomposition on an image. Since singular value decomposition generally has a high calculation cost, there is a problem that a change in an image cannot be detected in real time due to the calculation of the left singular vectors being a bottleneck.

The present invention has been devised to solve the above problem, and an object of the present invention is to obtain an image change detection device and an image change detection method with which, when an image in a certain change detection period has not changed from an image in a certain period for comparison, it is possible to determine whether or not an image in a change detection period next to the certain change detection period has changed from an image in a period for comparison next to the certain period for comparison without performing singular value decomposition on the image in the period for comparison next to the certain period for comparison.

Solution to Problem

An image change detection device according to the present invention includes processing circuitry to calculate, by a degree of change calculator implemented by the processing circuitry, a degree of change between a first subspace and a second subspace, when receiving the first subspace and the second subspace, the first subspace being a space whose bases are left singular vectors of an image in a certain period for comparison from among images generated on a basis of an observation radio wave of a radar, the second subspace being a space whose bases are left singular vectors of an image in a certain change detection period that is a period different from the certain period for comparison from among the images generated on a basis of the observation radio wave of the radar, to determine, by a determinator implemented by the processor, whether or not the image in the certain change detection period has changed from the image in the certain period for comparison on a basis of the degree of change calculated by the degree-of-change calculator, and to update, by a subspace updater implemented by the processing circuitry, the first subspace by rotating the first subspace so that the first subspace approaches the second subspace when the determinator determines that there has been no change. When the determinator determines that there has been no change, the degree-of-change calculator calculates another degree of change between the first subspace which has been updated by the subspace updater and the second subspace whose bases are left singular vectors of an image in another change detection period next to the certain change detection period, and the determinator determines that the image in the certain change detection period has changed from the image in the certain period for comparison when the degree of change calculated by the degree-of-change calculator is equal to or greater than a threshold, and determines that the image in the certain change detection period has not changed from the image in the certain period for comparison when the degree of change is less than the threshold.

Advantageous Effects of Invention

According to the present invention, the image change detection device includes a subspace updating unit to update the first subspace by rotating the first subspace so that the first subspace approaches the second subspace when the determination unit determines that there has been no change. When the determination unit determines that there has been no change, the degree-of-change calculating unit calculates a degree of change between the first subspace which has been updated by the subspace updating unit and the second subspace whose bases are left singular vectors of an image in another change detection period next to the certain change detection period. Therefore, the image change detection device according to the present invention can determine, when an image in a certain change detection period has not changed from an image in a certain period for comparison, whether or not an image in a change detection period next to the certain change detection period has changed from an image in a period for comparison next to the certain period for comparison without performing singular value decomposition on the image in the period for comparison next to the certain period for comparison.

BRIEF DESCRIPTION OF DRAWINGS

FIG. 3 is a hardware configuration diagram of a computer in a case where the image change detection device 4 is implemented by software, firmware, or the like.

DESCRIPTION OF EMBODIMENTS

In order to describe the present invention in more detail, some modes for carrying out the present invention will be described with reference to the accompanying drawings.

First Embodiment

Figure 1:
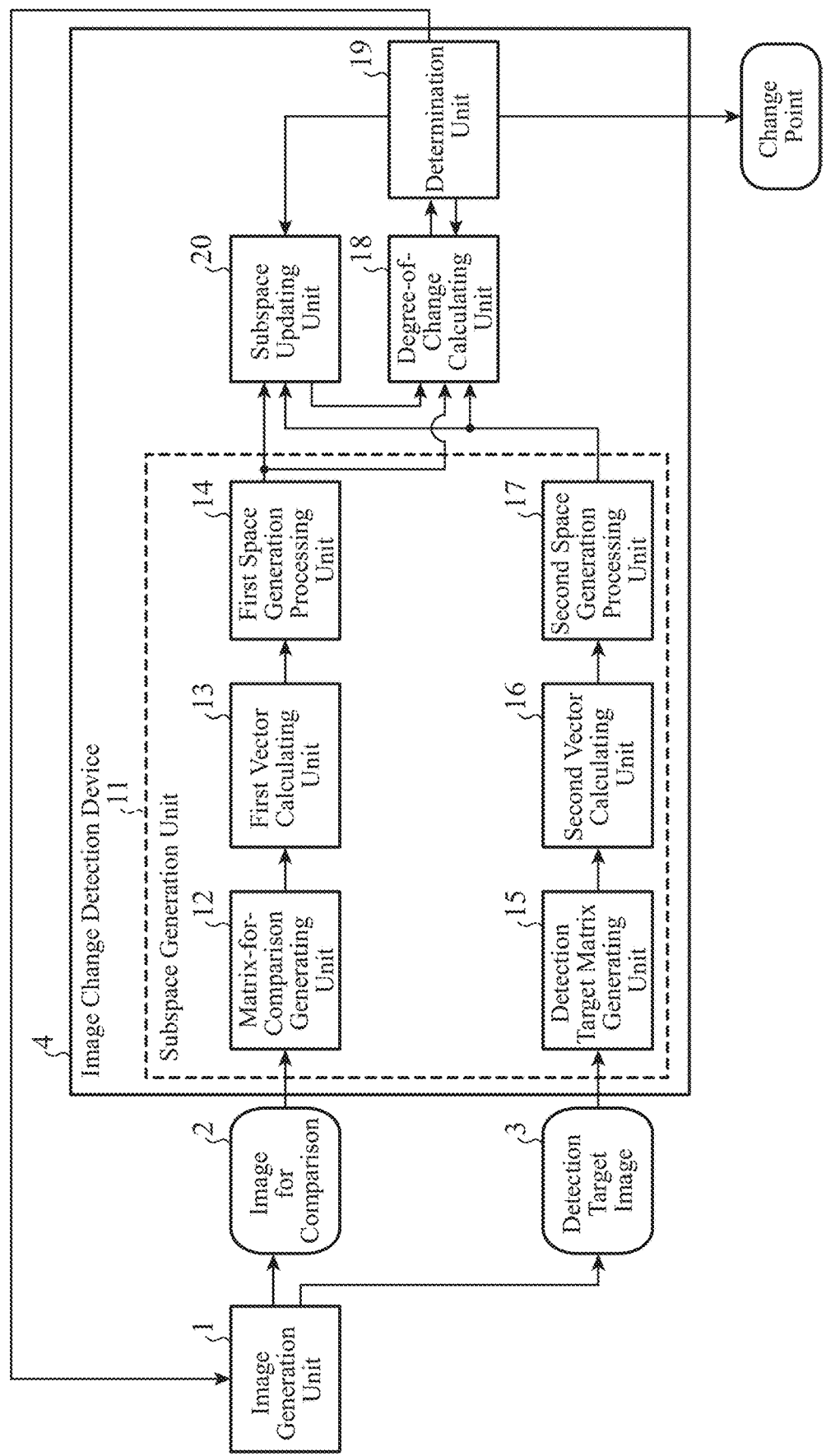
FIG. 1 is a configuration diagram illustrating an image change detection device 4 according to a first embodiment.

FIG. 1 is a configuration diagram illustrating an image change detection device 4 according to a first embodiment.

Figure 2:
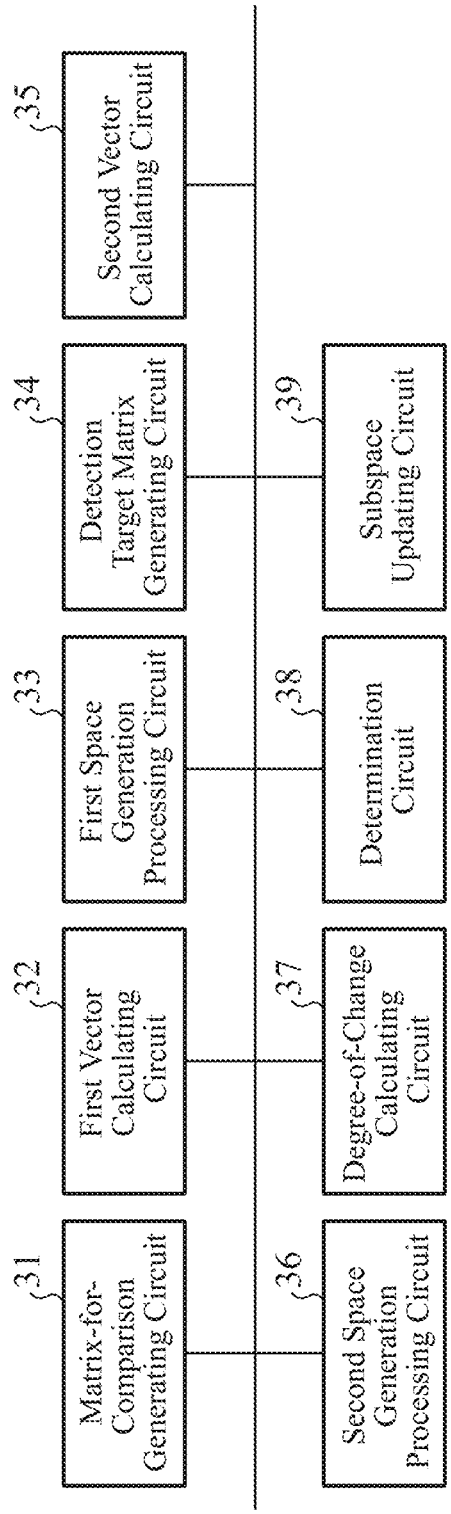
FIG. 2 is a hardware configuration diagram illustrating hardware of the image change detection device 4 according to the first embodiment.

FIG. 2 is a hardware configuration diagram illustrating hardware of the image change detection device 4 according to the first embodiment.

In FIG. 1, an image generation unit 1 generates a radio wave image on the basis of an observation radio wave of a radar.

The image generation unit 1 outputs, for example, a radio wave image in a period for comparison $T_1$ among the generated radio wave images to a matrix-for-comparison generating unit 12 of a subspace generation unit 11 described later. Hereinafter, the radio wave image output from the image generation unit 1 to the matrix-for-comparison generating unit 12 is referred to as an image for comparison 2.

The image generation unit 1 outputs, for example, the radio wave image in each of the change detection periods $T_2$, $T_4$, . . . among the generated radio wave images to a later-described detection target matrix generating unit 15 of the subspace generation unit 11. Hereinafter, the radio wave image output from the image generation unit 1 to the detection target matrix generating unit 15 is referred to as a detection target image 3.

When the determination result output from a determination unit 19 described later indicates that the detection target image 3 in the change detection period $T_2$ has changed from the image for comparison 2 in the period for comparison $T_1$, the image generation unit 1 outputs the image for comparison 2 in a period for comparison $T_3$ next to the period for comparison $T_1$ to the matrix-for-comparison generating unit 12, and outputs the detection target image 3 in the change detection period $T_4$ next to the change detection period $T_2$ to the detection target matrix generating unit 15.

When the determination result output from the determination unit 19 indicates that the detection target image 3 in the change detection period $T_2$ has not changed from the image for comparison 2 in the period for comparison $T_1$, the image generation unit 1 outputs the detection target image 3 in the change detection period $T_4$ to the detection target matrix generating unit 15 without outputting the image for comparison 2 in the period for comparison $T_3$ to the matrix-for-comparison generating unit 12.

In the image change detection device 4 illustrated in FIG. 1, the image generation unit 1 is provided outside the image change detection device 4. However, this is merely an example, and the image generation unit 1 may be provided inside the image change detection device 4.

The image change detection device 4 includes the subspace generation unit 11, a degree-of-change calculating unit 18, the determination unit 19, and a subspace updating unit 20.

The image change detection device 4 compares the image for comparison 2 generated by the image generation unit 1 with the detection target image 3 generated by the image generation unit 1, and determines whether or not the detection target image 3 has changed from the image for comparison 2.

In addition, the image change detection device 4 compares the image for comparison 2 after updating by the subspace updating unit 20 with the detection target image 3 generated by the image generation unit 1, and determines whether or not the detection target image 3 has changed from the image for comparison 2 after the updating.

The subspace generation unit 11 includes the matrix-for-comparison generating unit 12, a first vector calculating unit 13, a first space generation processing unit 14, the detection target matrix generating unit 15, a second vector calculating unit 16, and a second space generation processing unit 17.

When receiving the image for comparison 2 in the period for comparison $T_1$ from the image generation unit 1, the subspace generation unit 11 calculates left singular vectors $LSV_1$ of the image for comparison 2 and generates a first subspace span($U_1$) whose bases are the left singular vectors $LSV_1$.

The subspace generation unit 11 outputs the first subspace span($U_1$) to each of the degree-of-change calculating unit 18 and the subspace updating unit 20.

Further, when receiving the detection target images 3 in the change detection periods $T_2$, $T_4$, . . . from the image generation unit 1, the subspace generation unit 11 calculates left singular vectors $LSV_2$, $LSV_4$, . . . of the detection target images 3, and generates second subspaces span($U_2$), span($U_4$), . . . whose bases are the left singular vectors $LSV_2$, $LSV_4$, . . . , respectively.

The subspace generation unit 11 outputs the generated second subspaces span($U_2$), span($U_4$) . . . to each of the degree-of-change calculating unit 18 and the subspace updating unit 20.

When the determination unit 19 determines that there has been any change, the subspace generation unit 11 acquires the image for comparison 2 in the period for comparison $T_3$ next to the period for comparison $T_1$ from the image generation unit 1.

The subspace generation unit 11 calculates left singular vectors $LSV_3$ of the image for comparison 2 in the period for comparison $T_3$, generates a first subspace span($U_3$) whose bases are the left singular vectors $LSV_3$, and outputs the first subspace span($U_3$) to the degree-of-change calculating unit 18.

When the determination unit 19 determines that there has been no change, the subspace generation unit 11 does not acquire the image for comparison 2 in the period for comparison $T_3$ from the image generation unit 1. Therefore, the subspace generation unit 11 does not generate the first subspace span($U_3$) whose bases are the left singular vectors $LSV_3$.

The periods for comparison $T_1$ and $T_3$ and the change detection periods $T_2$, $T_4$, . . . are different from each other. Among the periods for comparison $T_1$ and $T_3$ and the change detection periods $T_2$ and $T_4$, the period for comparison $T_1$ is the most earliest period, the change detection period $T_2$ is the second earliest period, the period for comparison $T_3$ is the third earliest period, and the change detection period $T_4$ is the latest period, for example.

The matrix-for-comparison generating unit 12 is implemented by, for example, a matrix-for-comparison generating circuit 31 illustrated in FIG. 2.

The matrix-for-comparison generating unit 12 generates a matrix for comparison $U_1$ indicating the image for comparison 2 in the period for comparison $T_1$ output from the image generation unit 1, and outputs the matrix for comparison $U_1$ to the first vector calculating unit 13.

When receiving the image for comparison 2 in the period for comparison $T_3$ from the image generation unit 1, the matrix-for-comparison generating unit 12 generates a matrix for comparison $U_3$ indicating the image for comparison 2 in the period for comparison $T_3$, and outputs the matrix for comparison $U_3$ to the first vector calculating unit 13.

The first vector calculating unit 13 is implemented by, for example, a first vector calculating circuit 32 shown in FIG. 2.

The first vector calculating unit 13 calculates the left singular vectors $LSV_1$ of the image for comparison 2 by performing singular value decomposition on the matrix for comparison $U_1$ output from the matrix-for-comparison generating unit 12.

The first vector calculating unit 13 outputs the left singular vectors $LSV_1$ to the first space generation processing unit 14.

When receiving the matrix for comparison $U_3$ from the matrix-for-comparison generating unit 12, the first vector calculating unit 13 calculates the left singular vectors $LSV_3$ of the image for comparison 2 by performing singular value decomposition on the matrix for comparison $U_3$.

The first vector calculating unit 13 outputs the left singular vectors $LSV_3$ to the first space generation processing unit 14.

The first space generation processing unit 14 is implemented by, for example, a first space generation processing circuit 33 shown in FIG. 2.

When receiving, for example, the left singular vectors $LSV_1$ from the first vector calculating unit 13, the first space generation processing unit 14 generates the first subspace span($U_1$) whose bases are the left singular vectors $LSV_1$.

The first space generation processing unit 14 outputs the first subspace span($U_1$) to each of the degree-of-change calculating unit 18 and the subspace updating unit 20.

When receiving, for example, the left singular vectors $LSV_3$ from the first vector calculating unit 13, the first space generation processing unit 14 generates the first subspace span($U_3$) whose bases are the left singular vectors $LSV_3$.

The first space generation processing unit 14 outputs the first subspace span($U_3$) to each of the degree-of-change calculating unit 18 and the subspace updating unit 20.

The detection target matrix generating unit 15 is implemented by, for example, a detection target matrix generating circuit 34 illustrated in FIG. 2.

The detection target matrix generating unit 15 acquires the detection target images 3 in the change detection periods $T_2$, $T_4$, . . . from the image generation unit 1.

The detection target matrix generating unit 15 generates matrices for detection $U_2$, $U_4$, . . . indicating the respective detection target images 3, and outputs the matrices for detection $U_2$, $U_4$, . . . to the second vector calculating unit 16.

The second vector calculating unit 16 is implemented by, for example, a second vector calculating circuit 35 shown in FIG. 2.

The second vector calculating unit 16 calculates the left singular vectors $LSV_2$, $LSV_4$, . . . of the detection target images 3 by performing singular value decomposition on the matrices for detection $U_2$, $U_4$, . . . output from the detection target matrix generating unit 15.

The second vector calculating unit 16 outputs the left singular vectors $LSV_2$, $LSV_4$, . . . to the second space generation processing unit 17.

The second space generation processing unit 17 is implemented by, for example, a second space generation processing circuit 36 shown in FIG. 2.

The second space generation processing unit 17 generates second subspaces span($U_2$), span($U_4$), . . . whose bases are the left singular vectors $LSV_2$, $LSV_4$, . . . , respectively, which are output from the second vector calculating unit 16.

The second space generation processing unit 17 outputs the second subspaces span($U_2$), span($U_4$), . . . to each of the degree-of-change calculating unit 18 and the subspace updating unit 20.

The degree-of-change calculating unit 18 is implemented by, for example, a degree-of-change calculating circuit 37 illustrated in FIG. 2.

The degree-of-change calculating unit 18 acquires the first subspace span($U_1$) generated by the first space generation processing unit 14 of the subspace generation unit 11 and the second subspace span($U_2$) generated by the second space generation processing unit 17 of the subspace generation unit 11.

The degree-of-change calculating unit 18 calculates a degree of change $c(t_2)$ between the first subspace span($U_1$) and the second subspace span($U_2$).

The time $t_2$ is included in the change detection period $T_2$. The time $t_2$ may be a start time of the change detection period $T_2$ or an end time of the change detection period $T_2$. The time $t_2$ may be a time between the start time and the end time of the change detection period $T_2$.

The degree-of-change calculating unit 18 outputs the degree of change $c(t_2)$ to the determination unit 19.

When the determination unit 19 determines that the detection target image 3 in the change detection period $T_2$ has not changed from the image for comparison 2 in the period for comparison $T_1$, the degree-of-change calculating unit 18 acquires a first subspace span($U_3'$) which is the first subspace span($U_1$) updated by the subspace updating unit 20 and a second subspace span($U_4$) generated by the second space generation processing unit 17.

The degree-of-change calculating unit 18 calculates a degree of change $c(t_4)$ between the first subspace span($U_3'$) and the second subspace span($U_4$).

Assuming that the first subspace span($U_3$) with respect to the period for comparison $T_3$ is generated by the first space generation processing unit 14, the first subspace span($U_3'$) is similar to the first subspace span($U_3$).

The second subspace span($U_4$) generated by the second space generation processing unit 17 is a second subspace whose bases are the left singular vectors $LSV_4$ of the detection target image 3 in the change detection period $T_4$.

When the determination unit 19 determines that the detection target image 3 in the change detection period $T_2$ has changed from the image for comparison 2 in the period for comparison $T_1$, the degree-of-change calculating unit 18 acquires the first subspace span($U_3$) generated by the first space generation processing unit 14 and the second subspace span($U_4$) generated by the second space generation processing unit 17.

The degree-of-change calculating unit 18 calculates a degree of change $c(t_4)$ between the first subspace span($U_3$) and the second subspace span($U_4$).

The first subspace span($U_3$) generated by the subspace generation unit 11 is a subspace whose bases are the left singular vectors $LSV_3$ of the image for comparison 2 in the period for comparison $T_3$.

The determination unit 19 is implemented by, for example, a determination circuit 38 illustrated in FIG. 2.

The determination unit 19 determines whether or not the detection target image 3 in the change detection period has changed from the image for comparison 2 in the period for comparison on the basis of the degree of change calculated by the degree-of-change calculating unit 18.

That is, the determination unit 19 determines that the detection target image 3 in the change detection period $T_2$ has changed from the image for comparison 2 in the period for comparison $T_1$ when the degree of change $c(t_2)$ calculated by the degree-of-change calculating unit 18 is equal to or greater than a threshold $\theta$, and determines that the detection target image 3 in the change detection period $T_2$ has not changed from the image for comparison 2 in the period for comparison $T_1$ when the degree of change $c(t_2)$ is less than the threshold $\theta$.

In addition, the determination unit 19 determines that the detection target image 3 in the change detection period $T_4$ has changed from the image for comparison 2 in the period for comparison $T_3$ when the degree of change $c(t_4)$ calculated by the degree-of-change calculating unit 18 is equal to or greater than the threshold $\theta$, and determines that the detection target image 3 in the change detection period $T_4$ has not changed from the image for comparison 2 in the period for comparison $T_3$ when the degree of change $c(t_4)$ is less than the threshold $\theta$.

As the threshold $\theta$, a value of 0.5 or a value of 0.6 is used, for example. The threshold $\theta$ may be stored in an internal memory of the determination unit 19 or may be given from the outside of the image change detection device 4.

When determining that the detection target image 3 in the change detection period $T_2$ has changed from the image for comparison 2 in the period for comparison $T_1$, the determination unit 19 outputs information indicating that there is a change point in the radio wave image during the change detection period $T_2$ to the outside. In addition, when determining that the detection target image 3 in the change detection period $T_4$ has changed from the image for comparison 2 in the period for comparison $T_3$, the determination unit 19 outputs information indicating that there is a change point in the radio wave image during the change detection period $T_4$ to the outside.

The determination unit 19 outputs a determination result indicating whether or not the detection target image 3 has changed from the image for comparison 2 to each of the degree-of-change calculating unit 18 and the image generation unit 1.

In addition, when determining that the detection target image 3 in the change detection period $T_2$ has not changed from the image for comparison 2 in the period for comparison $T_1$, the determination unit 19 outputs the determination result indicating that the detection target image 3 in the change detection period $T_2$ has not changed from the image for comparison 2 in the period for comparison $T_1$ to the subspace updating unit 20.

In the image change detection device 4 illustrated in FIG. 1, the determination unit 19 compares the degree of change $c(t_2)$ or the like with the threshold $\theta$ to determine whether or not the detection target image 3 has changed from the image for comparison 2. However, this is merely an example, and the determination unit 19 may determine whether or not the detection target image 3 has changed from the image for comparison 2 by, for example, comparing a differential value of the degree of change $c(t_2)$ or the like with a threshold.

The subspace updating unit 20 is implemented by, for example, a subspace updating circuit 39 illustrated in FIG. 2.

When the determination unit 19 determines that the detection target image 3 in the change detection period $T_2$ has not changed from the image for comparison 2 in the period for comparison $T_1$, the subspace updating unit 20 updates the first subspace span($U_1$) by rotating the first subspace span($U_1$) so that the first subspace span($U_1$) approaches the second subspace span($U_2$).

The subspace updating unit 20 outputs the updated first subspace span($U_1$) to the degree-of-change calculating unit 18 as the first subspace span($U_3'$).

When the determination unit 19 determines that the detection target image 3 in the change detection period $T_2$ has changed from the image for comparison 2 in the period for comparison $T_1$, the subspace updating unit 20 does not update the first subspace span($U_1$).

In FIG. 1, it is assumed that the matrix-for-comparison generating unit 12, the first vector calculating unit 13, the first space generation processing unit 14, the detection target matrix generating unit 15, the second vector calculating unit 16, the second space generation processing unit 17, the degree-of-change calculating unit 18, the determination unit 19, and the subspace updating unit 20, which are the components of the image change detection device 4, are each implemented by dedicated hardware as shown in FIG. 2. That is, it is assumed that the image change detection device 4 is implemented by the matrix-for-comparison generating circuit 31, the first vector calculating circuit 32, the first space generation processing circuit 33, the detection target matrix generating circuit 34, the second vector calculating circuit 35, the second space generation processing circuit 36, the degree-of-change calculating circuit 37, the determination circuit 38, and the subspace updating circuit 39.

Here, each of the matrix-for-comparison generating circuit 31, the first vector calculating circuit 32, the first space generation processing circuit 33, the detection target matrix generating circuit 34, the second vector calculating circuit 35, the second space generation processing circuit 36, the degree-of-change calculating circuit 37, the determination circuit 38, and the subspace updating circuit 39 is, for example, a single circuit, a composite circuit, a programmed processor, a parallel programmed processor, an application specific integrated circuit (ASIC), a field-programmable gate array (FPGA), or a combination of some of these circuits.

The components of the image change detection device 4 are not limited to be implemented by dedicated hardware, and the image change detection device 4 may be implemented by software, firmware, or a combination of software and firmware.

Software or firmware is stored in a memory of a computer as a program. The computer means hardware that executes the program, and may be, for example, a central processing unit (CPU), central processor, processing unit, computing unit, microprocessor, microcomputer, processor, or digital signal processor (DSP).

Figure 3:
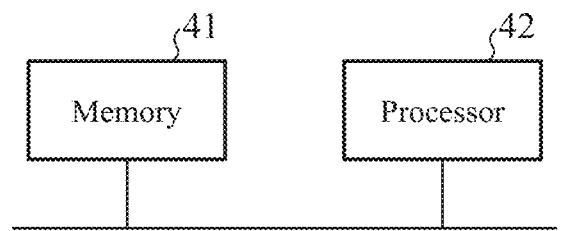

FIG. 3 is a hardware configuration diagram of a computer in a case where the image change detection device 4 is implemented by software, firmware, or the like.

In a case where the image change detection device 4 is implemented by software, firmware, or the like, a program for causing the computer to execute the processing procedures performed by the matrix-for-comparison generating unit 12, the first vector calculating unit 13, the first space generation processing unit 14, the detection target matrix generating unit 15, the second vector calculating unit 16, the second space generation processing unit 17, the degree-of-change calculating unit 18, the determination unit 19, and the subspace updating unit 20 is stored in a memory 41. Then, a processor 42 of the computer executes the program stored in the memory 41.

Further, FIG. 2 shows an example in which each of the components of the image change detection device 4 is implemented by dedicated hardware, and FIG. 3 shows an example in which the image change detection device 4 is implemented by software, firmware, or the like. However, this is merely an example, and some components in the image change detection device 4 may be implemented by dedicated hardware, and the remaining components may be implemented by software, firmware, or the like.

Next, the operation of the image change detection device 4 illustrated in FIG. 1 will be described.

Figure 4:
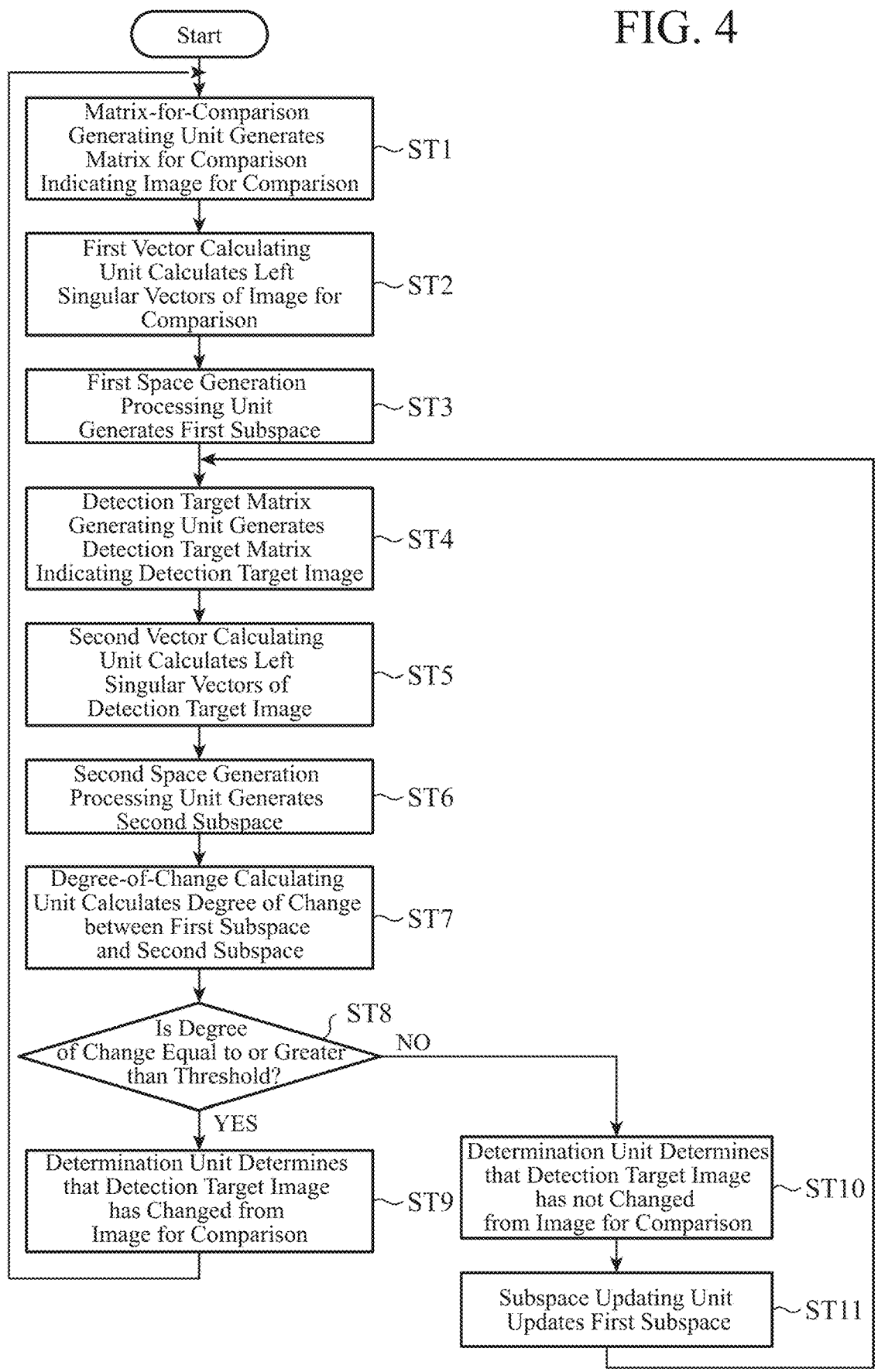
FIG. 4 is a flowchart illustrating an image change detection method which is a processing procedure performed by the image change detection device 4.

FIG. 4 is a flowchart illustrating an image change detection method which is a processing procedure performed by the image change detection device 4.

Figure 5:
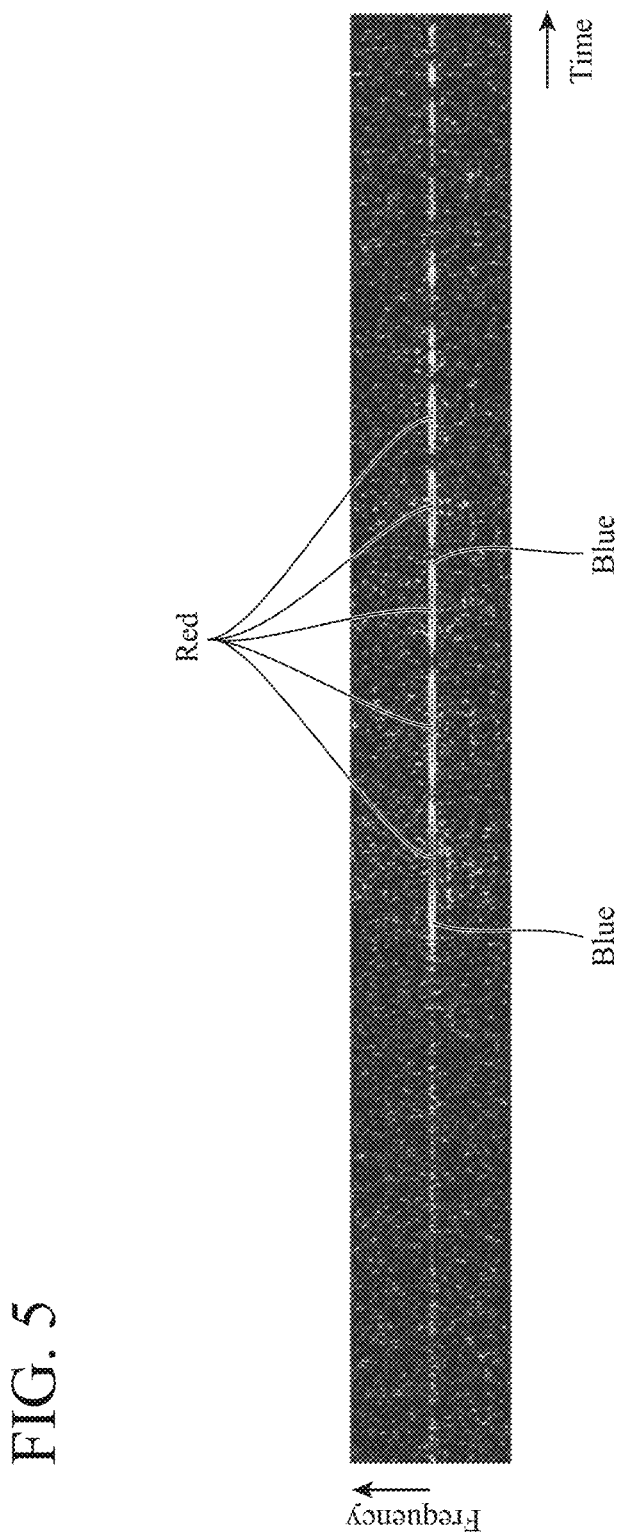
FIG. 5 is an explanatory diagram illustrating an example of a radio wave image generated on the basis of an observation radio wave of a radar.

FIG. 5 is an explanatory diagram illustrating an example of a radio wave image generated on the basis of an observation radio wave of a radar.

The radio wave image illustrated in FIG. 5 is, for example, an image obtained by visualizing a radio wave obtained by a propeller-type small drone as a micro Doppler spectrogram.

In FIG. 5, the horizontal axis represents time and the vertical axis represents frequency.

For example, a red pixel extending in the horizontal direction near the center of the vertical axis is a pixel having a larger amplitude, and a pixel closer to blue is a pixel having a smaller amplitude.

Among the plurality of pixels constituting the radio wave image illustrated in FIG. 5, pixels representing a target have a larger temporal change in amplitude than pixels not representing the target.

In the radio wave image illustrated in FIG. 5, a pixel group within a range in which there is a rapid change from blue to red and there is a rapid change from red to blue represents the target.

The image generation unit 1 generates a radio wave image as illustrated in FIG. 5 on the basis of the observation radio wave of the radar.

Figure 6:
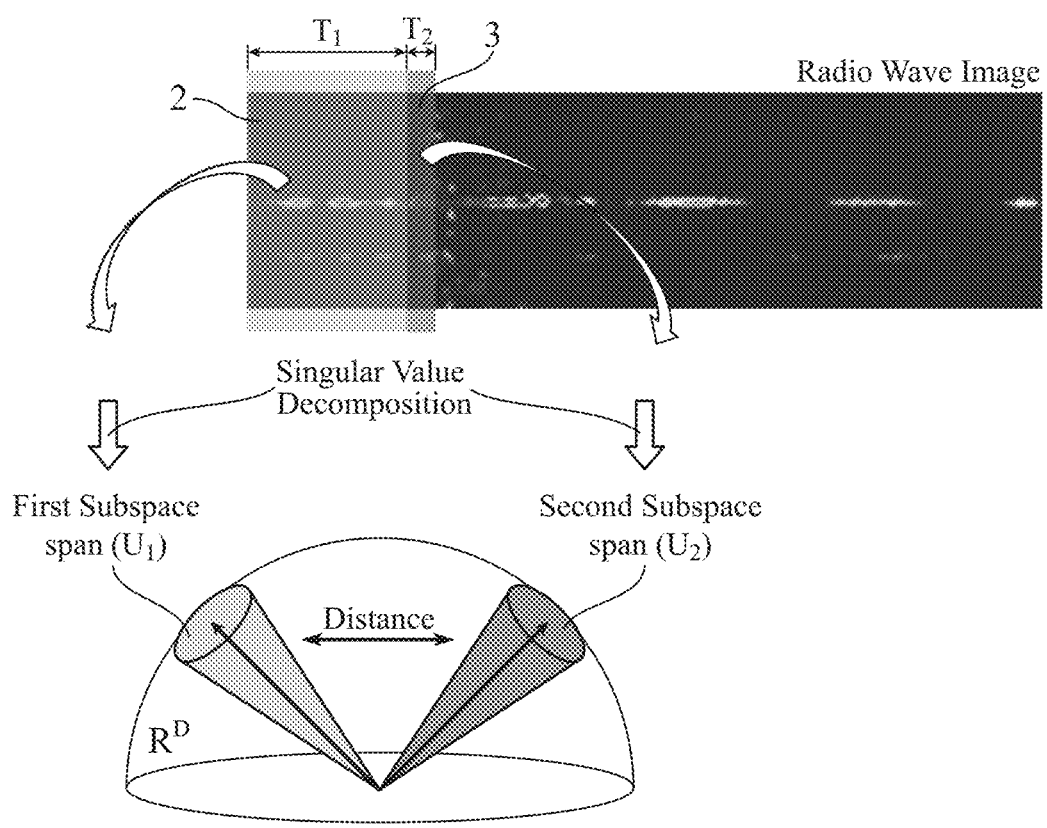
FIG. 6 is an explanatory diagram illustrating processing for generating a first subspace span($U_1$) and a second subspace span($U_2$) by a subspace generation unit 11.

The image generation unit 1 outputs a radio wave image in the period for comparison $T_1$ among the generated radio wave images to the matrix-for-comparison generating unit 12 of the subspace generation unit 11 as the image for comparison 2 (see FIG. 6).

The image generation unit 1 outputs a radio wave image in the change detection period $T_2$ among the generated radio wave images to the detection target matrix generating unit 15 of the subspace generation unit 11 as the detection target image 3 (see FIG. 6).

FIG. 6 is an explanatory diagram illustrating processing for generating the first subspace span($U_1$) and the second subspace span($U_2$) by the subspace generation unit 11.

In FIG. 6, for convenience, each of the first subspace span($U_1$) and the second subspace span($U_2$) is represented in the form of a cone. In practice, the first subspace span($U_1$) is a subspace formed by a set of a plurality of left singular vectors $LSV_1$ for the matrix for comparison $U_1$. Further, the second subspace span($U_2$) is a subspace formed by a set of a plurality of left singular vectors $LSV_2$ for the matrix for detection $U_2$.

The entire space RD including the first subspace span($U_1$) and the second subspace span($U_2$) is expressed by a hemisphere.

When receiving the image for comparison 2 in the period for comparison $T_1$ from the image generation unit 1, the matrix-for-comparison generating unit 12 generates a matrix for comparison U indicating the image for comparison 2 in the period for comparison $T_1$ (step ST1 in FIG. 4).

When the image for comparison 2 is, for example, a two-dimensional image having ($x_1 \times y_1$) pixel values, the matrix-for-comparison generating unit 12 generates a matrix having $x_1$ elements in the row direction and $y_1$ elements in the column direction as the matrix for comparison $U_1$. Each of $x_1$ and y 1 is an integer equal to or greater than 1.

The matrix-for-comparison generating unit 12 outputs the matrix for comparison $U_1$ to the first vector calculating unit 13.

When receiving the matrix for comparison $U_1$ from the matrix-for-comparison generating unit 12, the first vector calculating unit 13 calculates the left singular vectors $LSV_1$ of the image for comparison 2 by performing singular value decomposition on the matrix for comparison $U_1$ (step ST2 in FIG. 4).

The processing for calculating the left singular vectors $LSV_1$ by performing the singular value decomposition on the matrix for comparison $U_1$ is known, and thus the detailed description thereof will be omitted.

The maximum number of left singular vectors $LSV_1$ calculated by the first vector calculating unit 13 is determined by the rank of the matrix for comparison $U_1$. The first vector calculating unit 13 may calculate any number of left singular vectors $LSV_1$. Any number may be stored in the internal memory of the first vector calculating unit 13, or may be given from the outside.

Alternatively, the first vector calculating unit 13 may select the left singular vectors $LSV_1$ in which the cumulative contribution ratio of the singular value is larger than a certain threshold from among the plurality of left singular vectors $LSV_1$ that can be calculated.

The first vector calculating unit 13 outputs the calculated left singular vectors $LSV_1$ to the first space generation processing unit 14.

When receiving the left singular vectors $LSV_1$ from the first vector calculating unit 13, the first space generation processing unit 14 generates the first subspace span($U_1$) whose bases are the left singular vectors $LSV_1$ (step ST3 in FIG. 4).

The first subspace span($U_1$) is a subspace formed by a set of the top n left singular vectors $LSV_1$ having a large singular value with respect to the matrix for comparison $U_1$ among the plurality of left singular vectors $LSV_1$ in the image for comparison 2. The number n is an integer equal to or greater than 2. Note that, since the plurality of left singular vectors $LSV_1$ in the image for comparison 2 is orthogonal to each other and have a norm equal to 1, the basis of the first subspace span($U_1$) is an orthonormal basis.

The first space generation processing unit 14 outputs the first subspace span($U_1$) to each of the degree-of-change calculating unit 18 and the subspace updating unit 20.

When receiving the detection target image 3 in the change detection period $T_2$ from the image generation unit 1, the detection target matrix generating unit 15 generates a matrix for detection $U_2$ indicating the detection target image 3 (step ST4 in FIG. 4).

When the detection target image 3 is, for example, a two-dimensional image having ($x_2 \times y_2$) pixel values, the detection target matrix generating unit 15 generates a matrix having $x_2$ elements in the row direction and $y_2$ elements in the column direction as the matrix for detection $U_2$. Each of $x_2$ and $y_2$ is an integer equal to or greater than 1.

In the image change detection device 4 illustrated in FIG. 1, $x_1 > x_2$ and $y_1 = y_2$.

The detection target matrix generating unit 15 outputs the matrix for detection $U_2$ to the second vector calculating unit 16.

When receiving the matrix for detection $U_2$ from the detection target matrix generating unit 15, the second vector calculating unit 16 calculates the left singular vectors $LSV_2$ of the detection target image 3 by performing singular value decomposition on the matrix for detection $U_2$ (step ST5 in FIG. 4).

The processing for calculating the left singular vectors $LSV_2$ by performing the singular value decomposition on the matrix for detection $U_2$ is known, and thus the detailed description thereof will be omitted.

The maximum number of left singular vectors $LSV_2$ calculated by the second vector calculating unit 16 is determined by the rank of the matrix for detection $U_2$. The second vector calculating unit 16 may calculate any number of left singular vectors $LSV_2$. Any number may be stored in the internal memory of the second vector calculating unit 16, or may be given from the outside.

Alternatively, the second vector calculating unit 16 may select the left singular vectors $LSV_2$ in which the cumulative contribution ratio of the singular value is larger than a certain threshold from among the plurality of left singular vectors $LSV_2$ that can be calculated.

The second vector calculating unit 16 outputs the calculated left singular vectors $LSV_2$ to the second space generation processing unit 17.

When receiving the left singular vectors $LSV_2$ from the second vector calculating unit 16, the second space generation processing unit 17 generates the second subspace span($U_2$) whose bases are the left singular vectors $LSV_2$ (step ST6 in FIG. 4).

The second subspace span($U_2$) is a subspace formed by a set of the top m left singular vectors $LSV_2$ having a large singular value with respect to the matrix for detection $U_2$ among the plurality of left singular vectors $LSV_2$ in the detection target image 3, m is an integer equal to or greater than 2. Note that, since the plurality of left singular vectors $LSV_2$ in the detection target image 3 is orthogonal to each other and have a norm equal to 1, the basis of the second subspace span($U_2$) is an orthonormal basis.

The second space generation processing unit 17 outputs the second subspace span($U_2$) to each of the degree-of-change calculating unit 18 and the subspace updating unit 20.

The degree-of-change calculating unit 18 acquires the first subspace span($U_1$) output from the first space generation processing unit 14 and the second subspace span($U_2$) output from the second space generation processing unit 17.

The degree-of-change calculating unit 18 calculates a degree of change $c(t_2)$ between the first subspace span($U_1$) and the second subspace span($U_2$) (step ST7 in FIG. 4).

The degree of change $c(t_2)$ corresponds to the distance (see FIG. 6) between the first subspace span($U_1$) and the second subspace span($U_2$). The degree of change $c(t_2)$ is expressed by Equation (1) below.

$$c(t_2) = 1 - \|U_1^T U_2\|_F \tag{1}$$

In Equation (1), $\|\cdot\|_F$ represents the Frobenius norm, and T represents transpose of matrix.

The degree-of-change calculating unit 18 outputs the degree of change $c(t_2)$ to the determination unit 19.

The determination unit 19 compares the degree of change $c(t_2)$ calculated by the degree-of-change calculating unit 18 with the threshold $\theta$.

If the degree of change $c(t_2)$ is equal to or greater than the threshold $\theta$ (step ST8 in FIG. 4: YES), the determination unit 19 determines that the detection target image 3 in the change detection period $T_2$ has changed from the image for comparison 2 in the period for comparison $T_1$ (step ST9 in FIG. 4).

When determining that there has been any change, the determination unit 19 outputs information indicating that there is a change point in the radio wave image during the change detection period $T_2$ to the outside.

If the degree of change $c(t_2)$ is less than the threshold $\theta$ (step ST8 in FIG. 4: NO), the determination unit 19 determines that the detection target image 3 in the change detection period $T_2$ has not changed from the image for comparison 2 in the period for comparison $T_1$ (step ST10 in FIG. 4).

The determination unit 19 outputs the determination result indicating whether or not the detection target image 3 in the change detection period $T_2$ has changed from the image for comparison 2 in the period for comparison $T_1$ to each of the degree-of-change calculating unit 18 and the image generation unit 1.

When determining that there has been no change, the determination unit 19 outputs the determination result indicating that the detection target image 3 in the change detection period $T_2$ has not changed from the image for comparison 2 in the period for comparison $T_1$ to the subspace updating unit 20.

When the determination result output from the determination unit 19 indicates that the detection target image 3 in the change detection period $T_2$ has changed from the image for comparison 2 in the period for comparison $T_1$, the image generation unit 1 outputs the image for comparison 2 in the period for comparison $T_3$ to the matrix-for-comparison generating unit 12 and outputs the detection target image 3 in the change detection period $T_4$ to the detection target matrix generating unit 15.

When the determination result output from the determination unit 19 indicates that the detection target image 3 in the change detection period $T_2$ has not changed from the image for comparison 2 in the period for comparison $T_1$, the image generation unit 1 outputs the detection target image 3 in the change detection period $T_4$ to the detection target matrix generating unit 15 without outputting the image for comparison 2 in the period for comparison $T_3$ to the matrix-for-comparison generating unit 12.

Figure 7:
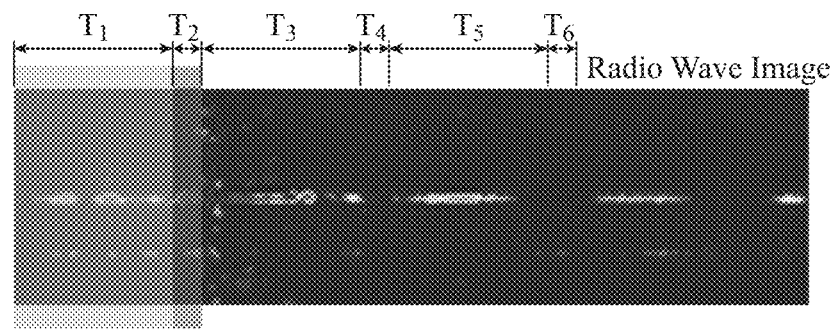
FIG. 7 is an explanatory diagram illustrating images for comparison 2 in periods for comparison $T_1$, $T_3$, and $T_5$ and detection target images 3 in change detection periods $T_2$, $T_4$, and $T_6$.

FIG. 7 is an explanatory diagram illustrating the images for comparison 2 in the periods for comparison $T_1$, $T_3$, and $T_5$ and the detection target images 3 in the change detection periods $T_2$, $T_4$, and $T_6$.

Here, for convenience of description, it is assumed that the determination result output from the determination unit 19 indicates that the detection target image 3 in the change detection period $T_2$ has not changed from the image for comparison 2 in the period for comparison $T_1$. Therefore, the image generation unit 1 outputs the detection target image 3 in the change detection period $T_4$ to the detection target matrix generating unit 15 without outputting the image for comparison 2 in the period for comparison $T_3$ to the matrix-for-comparison generating unit 12.

When receiving, from the determination unit 19, the determination result indicating that the detection target image 3 in the change detection period $T_2$ has not changed from the image for comparison 2 in the period for comparison $T_1$, the subspace updating unit 20 updates the first subspace span($U_1$) (step ST11 in FIG. 4).

That is, the subspace updating unit 20 acquires the first subspace span($U_1$) output from the first subspace generation processing unit 14 and the second subspace span($U_2$) output from the second subspace generation processing unit 17.

The subspace updating unit 20 updates the first subspace span($U_1$) by rotating the first subspace span($U_1$) so that the first subspace span($U_1$) approaches the second subspace span($U_2$).

In a case where the determination unit 19 has already determined twice or more, the subspace updating unit 20 may have received the previous determination result before receiving the current determination result from the determination unit 19. In a case where the subspace updating unit 20 already updates the first subspace span(U) because the previous determination result output from the determination unit 19 indicates that there has been no change, the subspace updating unit 20 further updates the updated first subspace span($U_1$) instead of the first subspace span($U_1$) output from the first subspace generation processing unit 14.

Equation (2) below is for updating the matrix for comparison $U_1$ related to the first subspace span($U_1$). Equation (2) indicates the relationship between the matrix for comparison $U_1$ related to the first subspace span($U_1$), the matrix for detection $U_2$ related to the second subspace span($U_2$), and the matrix for comparison $U_3'$ related to the first subspace span($U_3'$) which is the updated first subspace span($U_1$).

$$U_3' = \mathrm{orth}((1 + \mu U_2 U_2^T) U_1) \quad (2)$$

In Equation (2), $\mu$ represents a rotation coefficient, and I represents an identity matrix.

The function orth( ) is an orthonormalization function. As the orthonormalization, Gram-Schmidt orthonormalization can be used, for example.

The subspace updating unit 20 outputs the updated first subspace span($U_1$) to the degree-of-change calculating unit 18 as the first subspace span($U_3'$).

Figure 8:
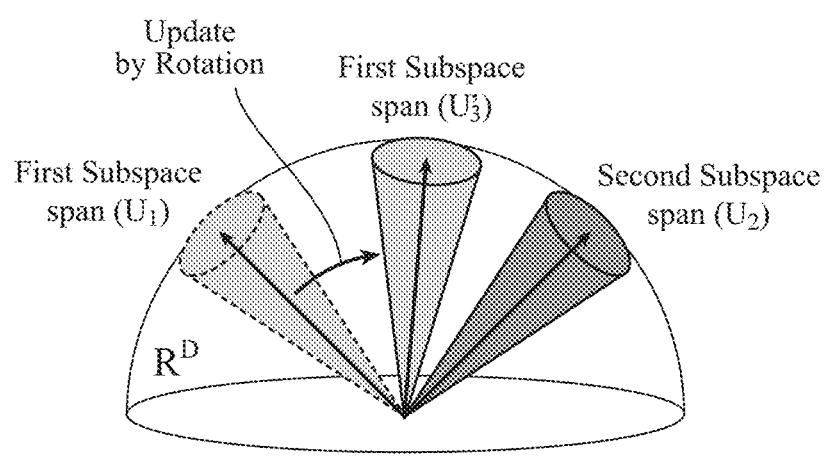
FIG. 8 is an explanatory diagram illustrating processing for updating the first subspace span($U_1$) by a subspace updating unit 20.

FIG. 8 is an explanatory diagram illustrating processing for updating the first subspace span($U_1$) by the subspace updating unit 20.

In FIG. 8, the subspace updating unit 20 rotates the first subspace span($U_1$) so that the first subspace span($U_1$) approaches the second subspace span($U_2$).

By rotating the first subspace span($U_1$) so that the first subspace span($U_1$) approaches the second subspace span($U_2$), the information of the second subspace span($U_2$) is reflected in the first subspace span($U_3'$). Therefore, the first subspace span($U_3'$) is a subspace similar to the first subspace span($U_3$) related to the period for comparison $T_3$. The first subspace span($U_3$) in the period for comparison $T_3$ is a subspace assumed to be generated from the image for comparison 2 in the period for comparison $T_3$ by the subspace generation unit 11.

When receiving the detection target image 3 in the change detection period $T_4$ from the image generation unit 1, the detection target matrix generating unit 15 generates a matrix for detection $U_4$ indicating the detection target image 3, and outputs the matrix for detection $U_4$ to the second vector calculating unit 16 (step ST4 in FIG. 4).

When receiving the matrix for detection $U_4$ from the detection target matrix generating unit 15, the second vector calculating unit 16 calculates the left singular vectors $LSV_4$ of the detection target image 3 by performing singular value decomposition on the matrix for detection $U_4$ (step ST5 in FIG. 4).

The second vector calculating unit 16 outputs the calculated left singular vectors $LSV_4$ to the second space generation processing unit 17.

When receiving the left singular vectors $LSV_4$ from the second vector calculating unit 16, the second space generation processing unit 17 generates the second subspace span($U_4$) whose bases are the left singular vectors $LSV_4$ (step ST6 in FIG. 4).

The second subspace span($U_4$) is a subspace formed by a set of the top m left singular vectors $LSV_4$ having a large singular value with respect to the matrix for detection $U_4$ among the plurality of left singular vectors $LSV_4$ in the detection target image 3.

The second space generation processing unit 17 outputs the second subspace span($U_4$) to each of the degree-of-change calculating unit 18 and the subspace updating unit 20.

That is, the degree-of-change calculating unit 18 acquires the first subspace span($U_3'$) which is the updated first subspace span($U_1$) output from the subspace updating unit 20 and the second subspace span($U_4$) output from the second space generation processing unit 17.

The degree-of-change calculating unit 18 calculates a degree of change $c(t_4)$ between the first subspace span($U_3'$) and the second subspace span($U_4$) (step ST7 in FIG. 4).

The degree of change $c(t_4)$ corresponds to the distance between the first subspace span($U_3'$) and the second subspace span($U_4$). The degree of change $c(t_4)$ is expressed by Equation (3) below.

$$c(t_4) = 1 - \|U_3'^T U_4\|_F \quad (3)$$

The degree-of-change calculating unit 18 outputs the degree of change $c(t_4)$ to the determination unit 19.

The determination unit 19 compares the degree of change $c(t_4)$ calculated by the degree-of-change calculating unit 18 with the threshold $\theta$.

If the degree of change $c(t_4)$ is equal to or greater than the threshold $\theta$ (step ST8 in FIG. 4: YES), the determination unit 19 determines that the detection target image 3 in the change detection period $T_4$ has changed from the image for comparison 2 in the period for comparison $T_3$ (step ST9 in FIG. 4).

When determining that there has been any change, the determination unit 19 outputs information indicating that there is a change point in the radio wave image during the change detection period $T_4$ to the outside.

If the degree of change $c(t_4)$ is less than the threshold $\theta$ (step ST8 in FIG. 4: NO), the determination unit 19 determines that the detection target image 3 in the change detection period $T_4$ has not changed from the image for comparison 2 in the period for comparison $T_3$ (step ST10 in FIG. 4).

The determination unit 19 outputs the determination result indicating whether or not the detection target image 3 in the change detection period $T_4$ has changed from the image for comparison 2 in the period for comparison $T_3$ to each of the degree-of-change calculating unit 18 and the image generation unit 1.

When determining that there has been no change, the determination unit 19 outputs the determination result indicating that the detection target image 3 in the change detection period $T_4$ has not changed from the image for comparison 2 in the period for comparison $T_3$ to the subspace updating unit 20.

When the determination result output from the determination unit 19 indicates that the detection target image 3 in the change detection period $T_4$ has changed from the image for comparison 2 in the period for comparison $T_3$, the image generation unit 1 outputs the image for comparison 2 in the period for comparison $T_5$ to the matrix-for-comparison generating unit 12 and outputs the detection target image 3 in the change detection period $T_6$ to the detection target matrix generating unit 15.

When the determination result output from the determination unit 19 indicates that the detection target image 3 in the change detection period $T_4$ has not changed from the image for comparison 2 in the period for comparison $T_3$, the image generation unit 1 outputs the detection target image 3 in the change detection period $T_6$ to the detection target matrix generating unit 15 without outputting the image for comparison 2 in the period for comparison $T_5$ to the matrix-for-comparison generating unit 12.

Here, for convenience of description, it is assumed that the determination result output from the determination unit 19 indicates that the detection target image 3 in the change detection period $T_4$ has changed from the image for comparison 2 in the period for comparison $T_3$. Therefore, the image generation unit 1 outputs the image for comparison 2 in the period for comparison $T_5$ to the matrix-for-comparison generating unit 12 and outputs the detection target image 3 in the change detection period $T_6$ to the detection target matrix generating unit 15.

When receiving the image for comparison 2 in the period for comparison $T_5$ from the image generation unit 1, the matrix-for-comparison generating unit 12 generates a matrix for comparison $U_5$ indicating the image for comparison 2 in the period for comparison $T_5$, and outputs the matrix for comparison $U_5$ to the first vector calculating unit 13 (step ST1 in FIG. 4).

When receiving the matrix for comparison $U_5$ from the matrix-for-comparison generating unit 12, the first vector calculating unit 13 calculates the left singular vectors $LSV_5$ of the image for comparison 2 by performing singular value decomposition on the matrix for comparison $U_5$ (step ST2 in FIG. 4).

The first vector calculating unit 13 outputs the calculated left singular vectors $LSV_5$ to the first space generation processing unit 14.

When receiving the left singular vectors $LSV_5$ from the first vector calculating unit 13, the first space generation processing unit 14 generates the first subspace span($U_5$) whose bases are the left singular vectors $LSV_5$ (step ST3 in FIG. 4).

The first subspace span($U_5$) is a subspace formed by a set of the top n left singular vectors $LSV_1$ having a large singular value with respect to the matrix for comparison $U_5$ among the plurality of left singular vectors $LSV_5$ in the image for comparison 2.

The first space generation processing unit 14 outputs the first subspace span($U_5$) to each of the degree-of-change calculating unit 18 and the subspace updating unit 20.

When receiving the detection target image 3 in the change detection period $T_6$ from the image generation unit 1, the detection target matrix generating unit 15 outputs a matrix for detection $U_6$ indicating the detection target image 3 to the second vector calculating unit 16 (step ST4 in FIG. 4).

When receiving the matrix for detection $U_6$ from the detection target matrix generating unit 15, the second vector calculating unit 16 calculates the left singular vectors $LSV_6$ of the detection target image 3 by performing singular value decomposition on the matrix for detection $U_6$ (step ST5 in FIG. 4).

The second vector calculating unit 16 outputs the calculated left singular vectors $LSV_6$ to the second space generation processing unit 17.

When receiving the left singular vectors $LSV_6$ from the second vector calculating unit 16, the second space generation processing unit 17 generates the second subspace span($U_6$) whose bases are the left singular vectors $LSV_6$ (step ST6 in FIG. 4).

The second subspace span($U_6$) is a subspace formed by a set of the top m left singular vectors $LSV_6$ having a large singular value with respect to the matrix for detection $U_6$ among the plurality of left singular vectors $LSV_6$ in the detection target image 3.

The second space generation processing unit 17 outputs the second subspace span($U_6$) to each of the degree-of-change calculating unit 18 and the subspace updating unit 20.

The degree-of-change calculating unit 18 acquires the first subspace span($U_5$) output from the first space generation processing unit 14 and the second subspace span($U_6$) output from the second space generation processing unit 17.

The degree-of-change calculating unit 18 calculates a degree of change $c(t_6)$ between the first subspace span($U_5$) and the second subspace span($U_6$) (step ST7 in FIG. 4).

The degree of change $c(t_6)$ corresponds to the distance between the first subspace span($U_5$) and the second subspace span($U_6$). The degree of change $c(t_6)$ is expressed by Equation (4) below.

$$c(t_6) = 1 - \|U_5^T U_6\|_F \quad (4)$$

The degree-of-change calculating unit 18 outputs the degree of change $c(t_6)$ to the determination unit 19.

The determination unit 19 compares the degree of change $c(t_6)$ calculated by the degree-of-change calculating unit 18 with the threshold θ.

If the degree of change $c(t_6)$ is equal to or greater than the threshold θ (step ST8 in FIG. 4: YES), the determination unit 19 determines that the detection target image 3 in the change detection period $T_6$ has changed from the image for comparison 2 in the period for comparison $T_5$ (step ST9 in FIG. 4).

When determining that there has been any change, the determination unit 19 outputs information indicating that there is a change point in the radio wave image during the change detection period $T_6$ to the outside.

If the degree of change $c(t_6)$ is less than the threshold θ (step ST8 in FIG. 4: NO), the determination unit 19 determines that the detection target image 3 in the change detection period $T_6$ has not changed from the image for comparison 2 in the period for comparison $T_5$ (step ST10 in FIG. 4).

The determination unit 19 outputs the determination result indicating whether or not the detection target image 3 in the change detection period $T_6$ has changed from the image for comparison 2 in the period for comparison $T_5$ to each of the degree-of-change calculating unit 18 and the image generation unit 1.

When determining that there has been no change, the determination unit 19 outputs the determination result indicating that the detection target image 3 in the change detection period $T_6$ has not changed from the image for comparison 2 in the period for comparison $T_5$ to the subspace updating unit 20.

The image change detection device 4 illustrated in FIG. 1 executes the processing procedure illustrated in FIG. 4 until the detection target image 3 is no longer output from the image generation unit 1.

In the first embodiment described above, the image change detection device 4 includes the subspace updating unit 20 that updates the first subspace by rotating the first subspace so that the first subspace approaches the second subspace when the determination unit 19 determines that there has been no change, and the degree-of-change calculating unit 18 calculates the degree of change between the first subspace updated by the subspace updating unit 20 and the second subspace whose bases are the left singular vectors of the image in the change detection period next to the change detection period when the determination unit 19 determines that there has been no change. Therefore, the image change detection device 4 can determine, when an image in a certain change detection period has not changed from an image in a period for comparison, whether or not an image in a change detection period next to the certain change detection period has changed from an image in a period for comparison next to the period for comparison without performing singular value decomposition on the image in the period for comparison next to the period for comparison.

Second Embodiment

A second embodiment will describe an image change detection device 4 in which a subspace updating unit 21 updates the first subspace by rotating the first subspace more largely as the degree of change calculated by the degree-of-change calculating unit 18 is larger.

Figure 9:
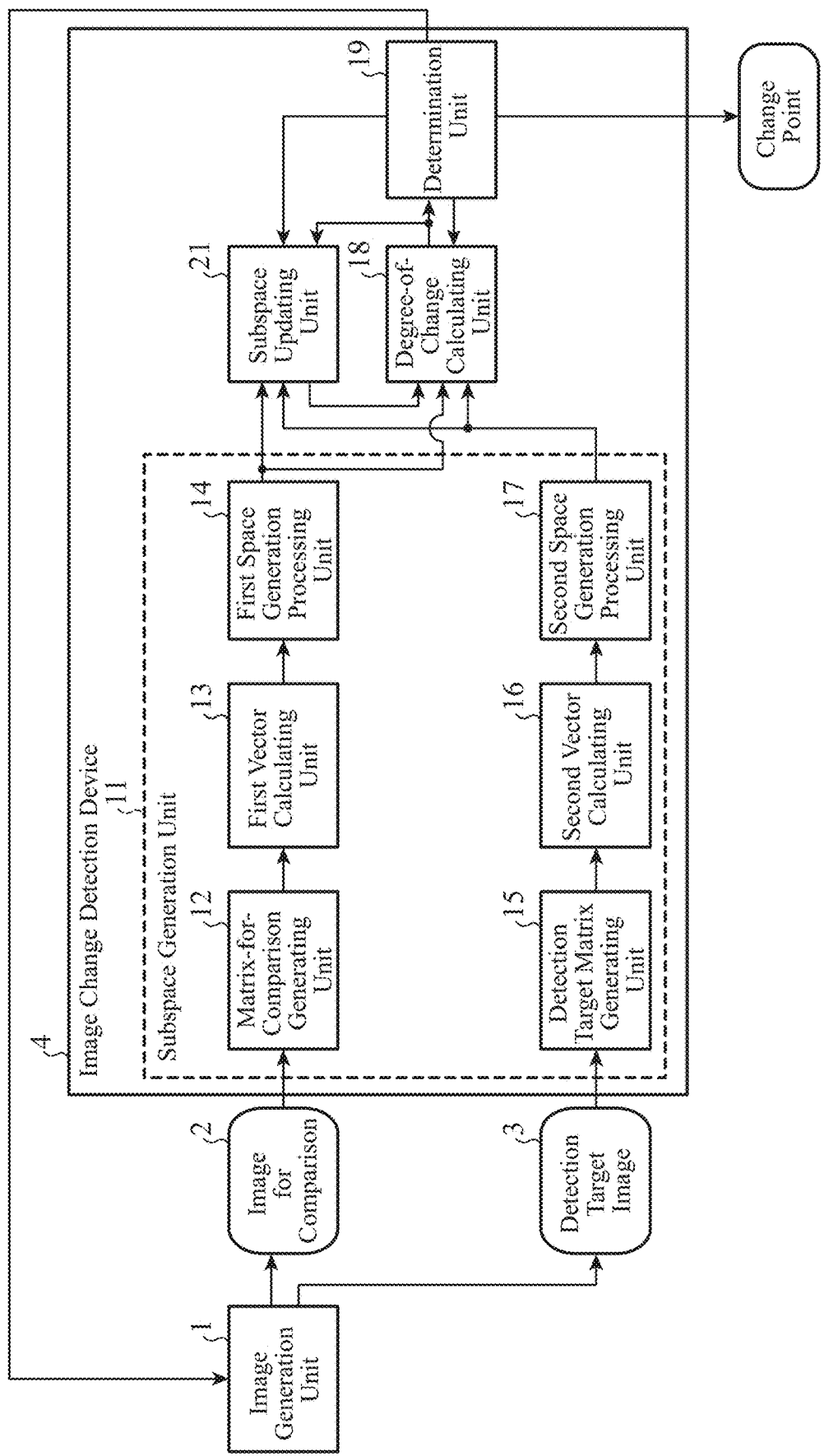
FIG. 9 is a configuration diagram illustrating an image change detection device 4 according to a second embodiment.

FIG. 9 is a configuration diagram illustrating the image change detection device 4 according to the second embodiment.

Figure 10:
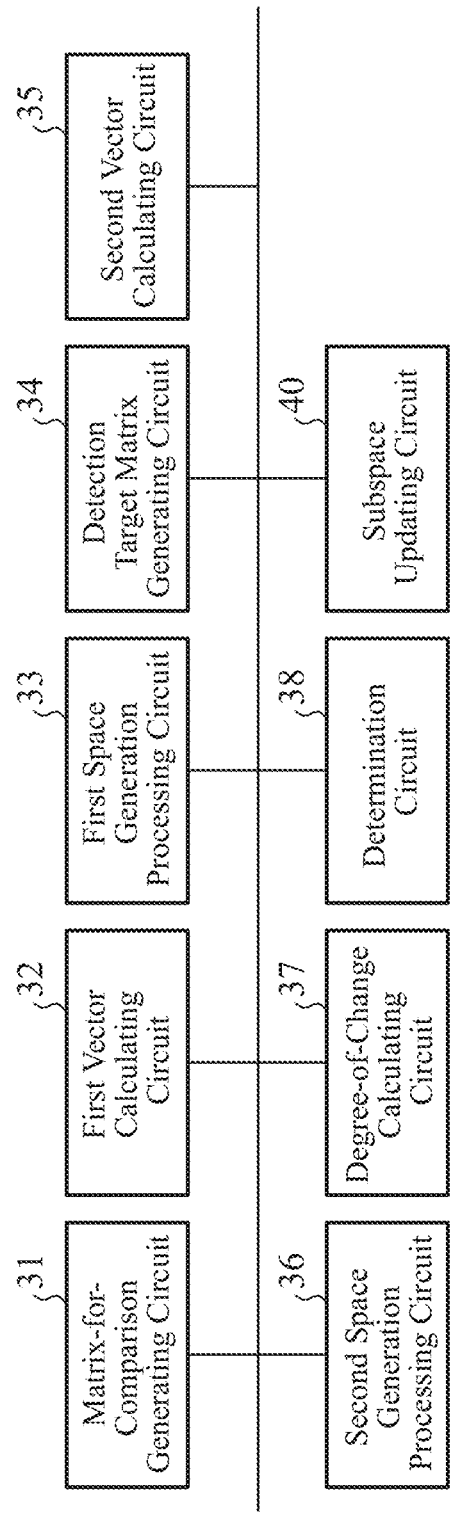
FIG. 10 is a hardware configuration diagram illustrating hardware of the image change detection device 4 according to the second embodiment.

FIG. 10 is a hardware configuration diagram illustrating hardware of the image change detection device 4 according to the second embodiment.

In FIGS. 9 and 10, elements same as or corresponding to the elements in FIGS. 1 and 2 are identified by the same reference numerals, and thus, the detailed description thereof will be omitted.

The subspace updating unit 21 is implemented by, for example, a subspace updating circuit 40 illustrated in FIG. 10.

When the determination unit 19 determines that the detection target image 3 in the change detection period $T_2$ has not changed from the image for comparison 2 in the period for comparison $T_1$, the subspace updating unit 21 updates the first subspace span($U_1$) by rotating the first subspace span($U_1$) so that the first subspace span($U_1$) approaches the second subspace span($U_2$), as in the subspace updating unit 20 illustrated in FIG. 1.

Note that, unlike the subspace updating unit 20 illustrated in FIG. 1, the subspace updating unit 21 updates the first subspace span($U_1$) by rotating the first subspace span($U_1$) more largely as the degree of change $c(t_2)$ calculated by the degree-of-change calculating unit 18 is larger.

The subspace updating unit 21 outputs the updated first subspace span($U_1$) to the degree-of-change calculating unit 18 as a first subspace span($U_3'$).

In FIG. 9, it is assumed that the matrix-for-comparison generating unit 12, the first vector calculating unit 13, the first space generation processing unit 14, the detection target matrix generating unit 15, the second vector calculating unit 16, the second space generation processing unit 17, the degree-of-change calculating unit 18, the determination unit 19, and the subspace updating unit 21, which are the components of the image change detection device 4, are each implemented by dedicated hardware as illustrated in FIG. 10. That is, it is assumed that the image change detection device 4 is implemented by the matrix-for-comparison generating circuit 31, the first vector calculating circuit 32, the first space generation processing circuit 33, the detection target matrix generating circuit 34, the second vector calculating circuit 35, the second space generation processing circuit 36, the degree-of-change calculating circuit 37, the determination circuit 38, and the subspace updating circuit 40.

The subspace updating circuit 40 is, for example, a single circuit, a composite circuit, a programmed processor, a parallel programmed processor, an ASIC, an FPGA, or a combination of some of these circuits.

The components of the image change detection device 4 are not limited to be implemented by dedicated hardware, and the image change detection device 4 may be implemented by software, firmware, or a combination of software and firmware.

In a case where the image change detection device 4 is implemented by software, firmware, or the like, a program for causing the computer to execute the processing procedures performed by the matrix-for-comparison generating unit 12, the first vector calculating unit 13, the first space generation processing unit 14, the detection target matrix generating unit 15, the second vector calculating unit 16, the second space generation processing unit 17, the degree-of-change calculating unit 18, the determination unit 19, and the subspace updating unit 21 is stored in the memory 41 illustrated in FIG. 3. Then, the processor 42 shown in FIG. 3 executes the program stored in the memory 41.

Further, FIG. 9 shows an example in which each of the components of the image change detection device 4 is implemented by dedicated hardware, and FIG. 3 shows an example in which the image change detection device 4 is implemented by software, firmware, or the like. However, this is merely an example, and some components in the image change detection device 4 may be implemented by dedicated hardware, and the remaining components may be implemented by software, firmware, or the like.

Next, the operation of the image change detection device 4 illustrated in FIG. 9 will be described.

Since the configuration other than the subspace updating unit 21 is similar to that of the image change detection device 4 illustrated in FIG. 1, the operation of the subspace updating unit 21 will be mainly described here.

As in the first embodiment, the degree-of-change calculating unit 18 calculates a degree of change $c(t_2)$ between the first subspace $span(U_1)$ and the second subspace $span(U_2)$.

The degree-of-change calculating unit 18 outputs the degree of change $c(t_2)$ to each of the subspace updating unit 21 and the determination unit 19.

When receiving, from the determination unit 19, the determination result indicating that the detection target image 3 in the change detection period $T_2$ has not changed from the image for comparison 2 in the period for comparison $T_1$, for example, the subspace updating unit 21 updates the first subspace $span(U_1)$ as in the subspace updating unit 20 in FIG. 1.

However, unlike the subspace updating unit 20 illustrated in FIG. 1, the subspace updating unit 21 calculates a rotation coefficient μ included in Equation (2) on the basis of the degree of change $c(t_2)$ calculated by the degree-of-change calculating unit 18. The rotation coefficient μ is a coefficient for rotating the first subspace span $(U_1)$ more largely as the degree of change $c(t_2)$ calculated by the degree-of-change calculating unit 18 is larger.

Therefore, unlike the subspace updating unit 20 illustrated in FIG. 1, the subspace updating unit 21 updates the first subspace $span(U_1)$ by rotating the first subspace $span(U_1)$ more largely as the degree of change $c(t_2)$ calculated by the degree-of-change calculating unit 18 is larger.

The maximum rotation of the first subspace $span(U_1)$ indicates a rotation by which the first subspace $span(U_1)$ reaches a position overlapping the second subspace span $(U_2)$. The subspace updating unit 21 rotates the first subspace $span(U_1)$ so that the first subspace $span(U_3')$ that is the updated first subspace $span(U_1)$ is located between the first subspace $span(U_1)$ and the second subspace $span(U_2)$.

The subspace updating unit 21 calculates the rotation coefficient μ as represented by Equation (5) below.

$$\mu = \left( \frac{\beta}{\alpha} \sqrt{\frac{\|U_2\|_F^2 - \alpha^2}{\|U_2\|_F^2 - \beta^2}} - 1 \right) / \|U_2\|_F^2 \quad (5)$$

-continued $$\alpha = \|TU_1\|_F^2$$

$$\beta = \alpha + \frac{\lambda}{2}$$

$$T = U_1 U_2^T$$

$$\lambda = \|(I - T)U_1\|_F^2 - \alpha + \delta, \delta \in R$$

Figure 11:
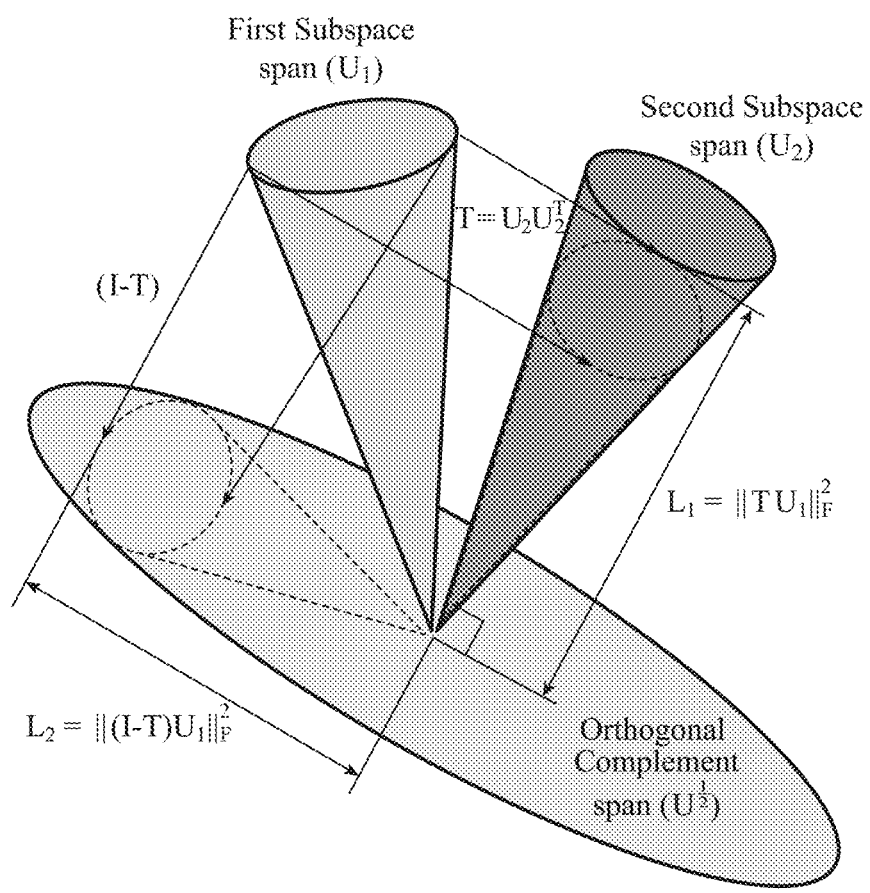
FIG. 11 is an explanatory diagram illustrating a length $L_1$ of the vector projection of the first subspace span($U_1$) with respect to the second subspace span($U_2$) and a length $L_2$ of the vector projection of the first subspace span($U_1$) with respect to an orthogonal complement span($U^{1/2}$).

The rotation coefficient μ indicated in Equation (5) is calculated by the ratio between a length $L_1$ of the vector projection of the first subspace $span(U_1)$ with respect to the second subspace $span(U_2)$ and a length $L_2$ of the vector projection of the first subspace $span(U_1)$ with respect to an orthogonal complement span(U) as shown in FIG. 11.

$$L_1 = \|TU_1\|_F^2 \quad (6)$$

$$L_2 = \|(1-T)U_1\|_F^2 \quad (7)$$

FIG. 11 is an explanatory diagram illustrating the length $L_1$ of the vector projection of the first subspace $span(U_1)$ with respect to the second subspace $span(U_2)$ and the length $L_2$ of the vector projection of the first subspace $span(U_1)$ with respect to the orthogonal complement $span(U^{1/2})$.

In the second embodiment described above, the image change detection device 4 illustrated in FIG. 9 is configured so that the subspace updating unit 21 updates the first subspace by rotating the first subspace more largely as the degree of change calculated by the degree-of-change calculating unit 18 is larger. Therefore, the image change detection device 4 illustrated in FIG. 9 can bring the updated first subspace closer to the first subspace generated by the first space generation processing unit 14 than the image change detection device 4 illustrated in FIG. 1.

It is to be noted that two or more of the above embodiments can be freely combined, or any component in the embodiments can be modified or omitted, within the scope of the present invention.

INDUSTRIAL APPLICABILITY

The present invention is suitable for an image change detection device and an image change detection method for determining whether or not an image has changed.

REFERENCE SIGNS LIST

1: image generation unit, 2: image for comparison, 3: detection target image, 4: image change detection device, 11: subspace generation unit, 12: matrix-for-comparison generating unit, 13: first vector calculating unit, 14: first space generation processing unit, 15: detection target matrix generating unit, 16: second vector calculating unit, 17: second space generation processing unit, 18: degree-of-change calculating unit, 19: determination unit, 20, 21: subspace updating unit, 31: matrix-for-comparison generating circuit, 32: first vector calculating circuit, 33: first space generation processing circuit, 34: detection target matrix generating circuit, 35: second vector calculating circuit. 36: second space generation processing circuit, 37: degree-of-change calculating circuit, 38: determination circuit, 39, 40: subspace updating circuit

The invention claimed is:

1. An image change detection device comprising processing circuitry to calculate, by a degree of change calculator implemented by the processing circuitry, a degree of change between a first subspace and a second subspace, when receiving the first subspace and the second subspace, the first subspace being a space whose bases are left singular vectors of an image in a certain period for comparison from among images generated on a basis of an observation radio wave of a radar, the second subspace being a space whose bases are left singular vectors of an image in a certain change detection period that is a period different from the certain period for comparison from among the images generated on a basis of the observation radio wave of the radar, to determine, by a determinator implemented by the processing circuitry, whether or not the image in the certain change detection period has changed from the image in the certain period for comparison on a basis of the degree of change calculated by the degree-of-change calculator, and to update, by a subspace updater implemented by the processing circuitry, the first subspace by rotating the first subspace so that the first subspace approaches the second subspace when the determinator determines that there has been no change, wherein, when the determinator determines that there has been no change, the degree-of-change calculator calculates another degree of change between the first subspace which has been updated by the subspace updater and the second subspace whose bases are left singular vectors of an image in another change detection period next to the certain change detection period, and the determinator determines that the image in the certain change detection period has changed from the image in the certain period for comparison when the degree of change calculated by the degree-of-change calculator is equal to or greater than a threshold, and determines that the image in the certain change detection period has not changed from the image in the certain period for comparison when the degree of change is less than the threshold.

2. The image change detection device according to claim 1, wherein, when the determinator determines that there has been any change, the degree-of-change calculator calculates a degree of change between the first subspace, that is different from the first subspace which has been updated, whose bases are left singular vectors of an image in another period for comparison next to the certain period for comparison, said another period for comparison being subsequent to the certain change detection period that is different from the certain period for comparison, and the second subspace whose bases are left singular vectors of an image in said another change detection period next to the certain change detection period.

3. The image change detection device according to claim 1, wherein the subspace updater updates the first subspace by rotating the first subspace more largely as the degree of change calculated by the degree-of-change calculator is larger.

4. The image change detection device according to claim 1, the processing circuit further performing to calculate, by a subspace generator implemented by the processing circuitry, left singular vectors of an image in said another change detection period next to the certain change detection period, generate the second subspace whose bases are the calculated left singular vectors, and output the generated second subspace to the degree-of-change calculator.

5. The image change detection device according to claim 4, wherein, when the determinator determines that there has been any change, the subspace generator calculates left singular vectors of an image in another period for comparison next to the certain period for comparison, said another period for comparison being subsequent to the certain change detection period that is different from the certain period for comparison, generates the first subspace whose bases are the calculated left singular vectors, and outputs the generated first subspace to the degree-of-change calculator.

6. An image change detection method comprising:

calculating, by a degree-of-change calculator, a degree of change between a first subspace and a second subspace, when the first subspace and the second subspace are received, the first subspace being a space whose bases are left singular vectors of an image in a certain period for comparison from among images generated on a basis of an observation radio wave of a radar, the second subspace being a space whose bases are left singular vectors of an image in a certain change detection period that is a period different from the certain period for comparison from among the images generated on a basis of the observation radio wave of the radar;

determining, by a determinator, whether or not the image in the certain change detection period has changed from the image in the certain period for comparison on a basis of the degree of change calculated by the degree-of-change calculator; and updating, by a subspace updater, the first subspace by rotating the first subspace so that the first subspace approaches the second subspace when the determinator determines that there has been no change, wherein, when the determinator determines that there has been no change, the degree-of-change calculator calculates another degree of change between the first subspace which has been updated by the subspace updater and the second subspace whose bases are left singular vectors of an image in another change detection period next to the certain change detection period, and the determinator determines that the image in the certain change detection period has changed from the image in the certain period for comparison when the degree of change calculated by the degree-of-change calculator is equal to or greater than a threshold, and determines that the image in the certain change detection period has not changed from the image in the certain period for comparison when the degree of change is less than the threshold.

\* \* \* \* \*